United States Patent Office 3,496,075
Patented Feb. 17, 1970

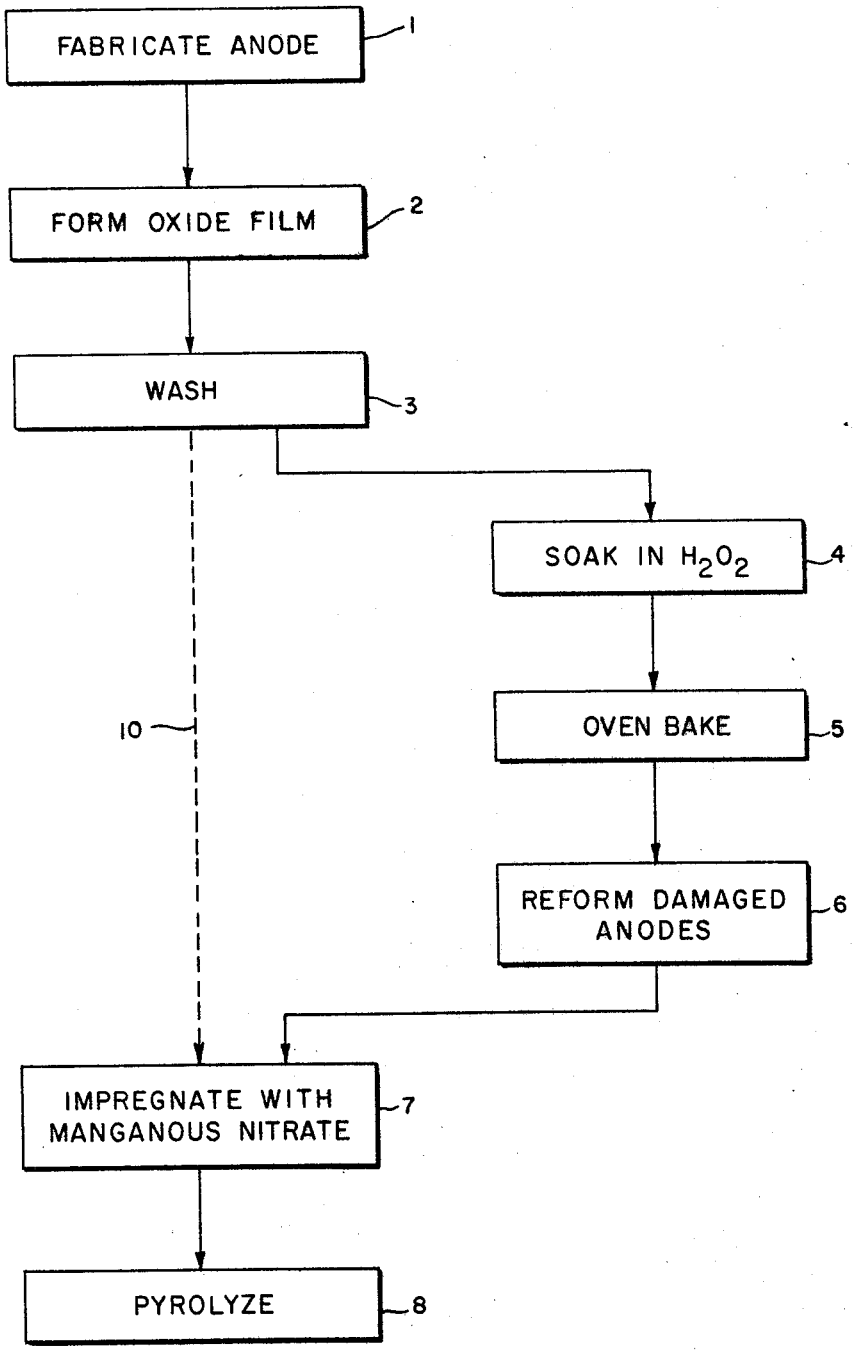

3,496,075
SURFACE TREATMENT FOR IMPROVED DRY ELECTROLYTIC CAPACITORS
John Silgailis, Billerica, Mass., assignor to P. R. Mallory & Co., Inc., Indianapolis, Ind., a corporation of Delaware
Filed Aug. 9, 1967, Ser. No. 659,508
Int. Cl. C23b 5/52
U.S. Cl. 204—37                                    7 Claims

ABSTRACT OF THE DISCLOSURE

A method for cleaning capacitors prior to the pyrolytic deposition of a material convertible to a semiconductive oxide wherein the anodized capacitors are soaked in hot hydrogen peroxide and then baked in a clean oven.

---

Generally, solid electrolyte capacitors are fabricated by pressing and sintering a film-forming metal such as tantalum, aluminum, niobium, titanium, zirconium, hafnium, and the like into a pellet having a multiplicity of intercommunicating voids. During the fabrication thereof, the pellet is subjected to anodization of electro-formation by passing a direct current from the pellet through an electrolyte in which the pellet is immersed, to a vessel containing the electrolyte. The voltage applied to the anode ranges from about 10–500 volts depending on the thickness of the anodized film desired. The higher the voltage that is used, the thicker the resulting film and the lower the resulting capacitance. The electrolyte solution may be an aqueous solution of sulfuric acid, nitric acid, phosphoric acid, and the like. The pellet is impregnated with a solution of a material convertible to a semiconductive oxide such as manganous nitrate, and heated in air at a sufficient temperature of about 200 to 400° C. to effect the pyrolytic conversion of the manganous nitrate covering the pellet and permeating the pores to a semiconductive solid electrolyte manganese dioxide. The anodization step and the pyrolytic conversion step may be repeated as many times as is necessary in order to obtain a pellet having the desired electrical characteristics. The manganese dioxide layer acts as the dry electrolyte for the capacitor. The cathode is prepared using conventional methods whereby an electrically conductive layer is applied over the manganese dioxide layer. Preferably, a graphite layer is applied to the oxidized anode before the cathode layer is applied. The capacitor is completed by attaching leads to the anode and to the cathode and encapsulating the capacitor.

It has been found in capacitors such as these that they sometimes suffer from unstable capacitance due to the poor adhesion of the manganese dioxide to the dielectric. This is caused by the organic contaminates that have collected on the anode pellet during processing. The contaminates remain between the dielectric and the manganese dioxide cathode material causing a poor, unstable bond.

In addition, it has been found that the capacitors suffer from high DC current leakages due to mechanical damage to the anode after sintering and prior to anodic forming.

The present invention is concerned with the fabrication of solid electrolyte capacitors and has as one of its objects the provision of a method of fabricating such capacitors such that their tendency to have unstable capacitance is eliminated or substantially reduced.

Another object of the invention is the provision of such a method which will eliminate or substantially reduce the tendency for such capacitors to suffer from high DC current leakage.

Another object of the invention is to provide a method of surface treatment for the processed anode of such capacitors.

Still another object of the invention is to provide a method of surface treatment for the processed anode wherein the anode is cleaned prior to impregnating the pores of the anode pellet with a solution for the pyrolytic formation of the cathode film.

Yet another object of the invention is to provide a method of surface treatment for the processed anode wherein the anode is soaked in hot hydrogen peroxide and then baked in a clean oven prior to impregnating the pores of the anode pellet with a solution for the pyrolytic formation of the cathode film.

With the above and other objects in view, which will appear as the description proceeds, this invention resides in a novel method for the surface treatment of anodized pellets for solid electrolyte capacitors substantially as described herein, and more particularly defined by the appended claims, it being understood that such changes in the precise embodiment of the invention here disclosed may be made as come within the scope of the claims.

In the drawings, the sole figure is a flow chart showing the steps used in carrying out the novel method of the invention.

Generally speaking, the objects of the invention are accomplished by providing a method for the surface treatment for an anodized pellet which comprises soaking the anodized pellet in hot hydrogen peroxide, baking the anode in a clean oven, and reforming the pellet when necessary.

Referring now to the drawing, steps 1 through 3 are steps that are normally taken in the preparation of solid electrolytic capacitors. In step 1 a film-forming metal such as tantalum, aluminum, niobium, titanium, zirconium, hafnium, and the like is pressed and sintered into a pellet having a multiplicity of intercommunicating voids. During the fabrication thereof, the pellet is, as indicated in step 2, subjected to anodization of electroformation by passing a direct current from the pellet through an electrolyte, in which the pellet is immersed, to a vessel containing the electrolyte so as to form a thin oxide film over the pellet to anodize the pellet. The electrolyte solution may be an aqueous solution of sulfuric acid, nitric acid, phosphoric acid, and the like. The higher the voltage used, the thicker the resulting film and the lower the capacitance. As indicated in step 3, the anodized pellet is then washed in deionized water in order to remove contaminants that have collected on the pellet during processing.

As indicated by the dotted line 10, the anodized pellet was then, prior to this invention, impregnated with a solution of a material convertible to a semiconductive oxide such as manganous nitrate. It has been found, however, that even though the pellet has been washed in deionized water, contaminates remain such that a secure bond is difficult if not impossible to achieve. To this end, the washed anodized pellet is, in step 4, soaked in a 5–50% hydrogen peroxide solution. This solution has been found to be suitable in that it eliminates or substantially reduces the contaminates, which appear to be principally hydrocarbons, without the formation of undesirable by-products. Potassium permanganate, for example, leaves undesirable by-products. While not desiring to be so limited, it is felt that the hydrogen peroxide solution undercuts and oxidizes the deposits, in part to carbon dioxide, and prevents the formation of free carbon. A preferred solution is 30% hydrogen peroxide.

The temperature of the hydrogen peroxide solution has been found to be critical. With the temperature being too low, the cleaning will not be completed; while if the temperature is too high the oxide film becomes damaged. A temperature range of from 20–90° C. has been found to be suitable, with 75° C. being preferred. The immersion time in the solution is largely empirical, the time being dependent to a great extent upon the time needed to complete the cleaning without damage to the oxide film. An immersion time of from 5 to 90 minutes has been found to be suitable with about 30 minutes being preferred.

The hydrogen peroxide is then, as shown in step 5, boiled off in a clean oven at 250°–400° C. for from 5 to 30 minutes. The temperatures and holding time in the oven have been found to be suitable for the same reasons as previously mentioned for the hydrogen peroxide cleaning. Preferably the temperature should be about 300° C. for about 30 minutes.

The cleaned anodes are then cooled, and the standard process continued as indicated in step 7. Prior to continuing with step 7, however, there may, on occasion, be anodes that have been damaged. Such anodes are first reformed, step 6, to 90% of the initial forming voltage. In the present process a 500 ohm-cm. $NH_4OH$ solution at a temperature of about 85° C. is preferred as the electrolyte solution because it leaves no undesirable deposits on the anode pellets and is more compatible with the subsequent process step than most acids.

After the anodes have been reformed, where necessary, the anodes are in steps 7 and 8 impregnated with a solution of a material convertible to a semiconductive oxide such as manganous nitrate and heated in air at a sufficient temperature of about 200–400° C. to effect the pyrolytic conversion of the nitrate covering the pellet and permeating the pores to a semiconductive solid electrolyte manganese dioxide.

Several solid tantalum capacitors have been tested using capacitors that were cleaned by the method of the present invention and capacitors that were fabricated by standard techniques. The table shows the improvement in capacitor performance. The capacitors are rated at 150 $\mu$f. at 6 working volts.

TABLE

| Cap. Change Wet to Dry (percent) | Cap. Change 25°–85° C. ($\mu$f.) | 6.5 v. DCL ($\mu$f.) |
|---|---|---|
| (A) CONTROL UNITS | | |
| 2.6 | 11.2 | 8.2 |
| 2.5 | 6.1 | 16.6 |
| 6.2 | 11.4 | 5.1 |
| 2.3 | 4.0 | 6.3 |
| 5.2 | 12.6 | 4.4 |
| 1.9 | 3.0 | 4.1 |
| 5.1 | 11.8 | 8.4 |
| 5.4 | 12.4 | 3.8 |
| 2.6 | 6.3 | 11.6 |
| 8.1 | 15.5 | 6.6 |
| *4.2 | *9.4 | *7.5 |
| (B) CLEANED UNITS | | |
| 3.1 | 5.6 | 3.6 |
| 3.6 | 5.4 | 1.3 |
| 2.7 | 2.0 | 0.52 |
| 2.1 | 5.8 | 0.66 |
| 2.6 | 4.3 | 0.94 |
| 1.8 | 6.0 | 0.46 |
| 1.7 | 5.4 | 0.91 |
| 3.3 | 2.0 | 0.41 |
| 2.7 | 5.7 | 0.66 |
| 4.0 | 4.6 | 0.52 |
| *2.8 | *4.7 | *1.0 |

*Average values.

From the table it is readily seen that the present invention markedly increases the performance characteristics of solid capacitors.

The present invention is not intended to be limited to the disclosure herein and changes and modifications may be made in the disclosure by those skilled in the art without departing from the spirit and scope of the invention. Such modifications and variations are considered to be within the purview and scope of this invention and the appended claims.

What is claimed is:

1. In a method for making a solid electrolyte capacitor including the steps of anodically forming a dielectric oxide film on the surface of a film-forming metal anode, covering the surface of said dielectric oxide film with a solution of a material convertible to a semiconductive oxide, heating said anode to a temperature for pyrolytically converting the material of said solution to a layer of dense semiconductive oxide material overlying said dielectric film and applying a counterelectrode of electrically conductive material on the surface of the semiconductive oxide layer, the improvement comprising: cleaning said metal anode after forming said dielectric oxide film with a hydrogen peroxide solution and boiling off such solution prior to covering the surface of said dielectric oxide with said solution of convertible material.

2. In a method for making a solid electrolyte capacitor as claimed in claim 1, wherein said hydrogen peroxide solution is a 5–50 percent solution.

3. In a method for making a solid electrolyte capacitor as claimed in claim 2, wherein said hydrogen peroxide solution is at a temperature of from 20–90° C.

4. In a method for making a solid electrolyte capacitor as claimed in claim 1, wherein said anode is cleaned in a 5–50 percent hydrogen peroxide solution at a temperature of from 20–90° C. for a period of from 5–90 minutes, and said hydrogen peroxide solution is boiled off at a temperature of from 250–400° C. for a period of from 5–30 minutes.

5. In a method for making a solid electrolyte capacitor including the steps of anodically forming a dielectric oxide film on the surface of a film-forming metal anode, covering the surface of said dielectric oxide film with a solution of a material convertible to a semiconductive oxide, heating said anode to a temperature for pyrolytically converting the material of said solution to a layer of dense semiconductive oxide material overlying said dielectric film and applying a counterelectrode of electrically conductive material on the surface of the semiconductive oxide layer, the improvement comprising: cleaning said metal anode after forming said dielectric oxide film with a hydrogen peroxide solution, boiling off such solution, and reforming said metal anode to 90 percent of the initial forming voltage prior to covering the surface of said dielectric oxide with said solution of convertible material.

6. In a method for making a solid electrolyte capacitor as claimed in claim 5, wherein the electrolyte for carrying out such reforming consists of a 5000 ohm-cm. $NH_4OH$ solution.

7. In a method for making a solid electrolyte capacitor including the steps of anodically forming a dielectric oxide film on the surface of a film-forming metal anode, covering the surface of said dielectric oxide film with a solution of a material convertible to a semiconductive oxide, heating said anode to a temperature for pyrolytically converting the material of said solution to a layer of dense semiconductive oxide material overlying said dielectric film and applying a counterelectrode of electrically conductive material on the surface of the semiconductive oxide layer, the improvement comprising: cleaning said metal anode after forming said dielectric oxide film with a 5–50% hydrogen peroxide solution having a temperature of from about 20–90° C. for a period of from 5–90 minutes, boiling off said solution at a temperature of from 250–400° C. for a period of from 5–30 minutes, and reforming said metal anode to 90% of the initial forming voltage in a 5000 ohm-cm. $NH_4OH$ solution prior to covering the surface of said dielectric oxide with said solution of convertible material.

References Cited

UNITED STATES PATENTS

| | | | |
|---|---|---|---|
| 3,301,704 | 1/1967 | Zind | 117—200 |
| 3,438,874 | 4/1969 | Rosztoczy | 204—37 |

ALLEN B. CURTIS, Primary Examiner

M. J. ANDREWS, Assistant Examiner